Figure 1A:
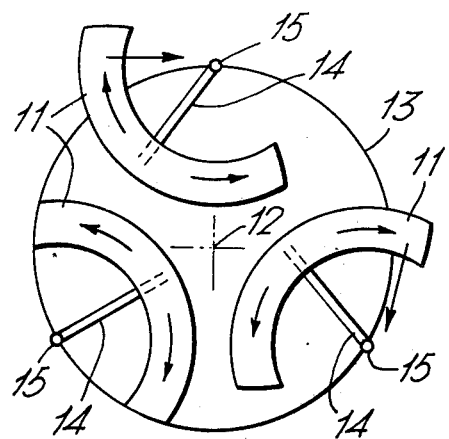

United States Patent [19]  [11] 4,113,204
Leek  [45] Sep. 12, 1978

[54] AUXILIARY CONTROL OF VEHICLE DIRECTION

[75] Inventor: Stanley Leek, Hatfield, England

[73] Assignee: Hawker Siddeley Dynamics Limited, England

[21] Appl. No.: 770,793

[22] Filed: Feb. 22, 1977

[30] Foreign Application Priority Data

Feb. 26, 1976 [GB] United Kingdom ............... 7596/76

[51] Int. Cl.² ..................... F42B 15/16; F42B 19/01
[52] U.S. Cl. .................................. 244/3.21; 114/23
[58] Field of Search .................. 244/3.1, 3.21, 3.22; 114/23

[56] References Cited

U.S. PATENT DOCUMENTS

| 2,520,433 | 8/1950 | Robinson | 244/3.21 |
| 2,793,591 | 5/1957 | Jasse | 244/3.29 |
| 3,125,313 | 3/1964 | Soderberg | 244/3.21 |

*Primary Examiner*—Verlin R. Pendegrass

*Attorney, Agent, or Firm*—Rose & Edell

[57] ABSTRACT

An auxiliary aerodynamic or hydrodynamic control assembly is provided for a vehicle, such as a guided missile, travelling in a fluid medium, which assembly comprises a number of, say three, control surfaces each carried at the inner end of an arm that is mounted at its outer end on a pivot situated at or near the periphery of a housing of circular cross section, the arm pivots being spaced equidistantly around said periphery. In its neutral or undeflected position each arm extends radially inward from the respective pivot and the control surface it carries, which is generally in the form of a circular arc centered on the pivot, lies retracted wholly within the housing. Angular movement of each arm about its pivot in one direction or the other causes one or the other half of the respective control surface to project from the housing. Different combinations of movement of the several control surfaces give rise to moments in roll, pitch or yaw.

9 Claims, 13 Drawing Figures

PHASE ERROR = 8°

PHASE ERROR AT ZERO EXTENSION = -10°

AUXILIARY CONTROL OF VEHICLE DIRECTION

This invention relates to control of the direction of travel of a vehicle through a fluid medium and is primarily concerned with the provision of means whereby aerodynamic or hydrodynamic control of a vehicle may be achieved.

In vehicles which are initially propelled by rocket motors or the like and afterwards complete their flight by coasting, there is a need for some auxiliary aerodynamic control to be effective when the propulsion motor is no longer capable of providing thrust vector control, so that the vehicle can be guided in the coasting and terminal phases, and the invention seeks to provide improved means to meet this and other requirements.

In the case of a guided missile, the auxiliary control system is required to operate during the coasting phase after motor burn-out and provide 3-axis control (pitch, yaw and roll) at missile speeds from about Mach 1.2 upwards, with a maximum manoeuvre capability of 20g. A higher minimum operating Mach number may be acceptable, but certainly not more than Mach 1.5.

Some capability for roll control during the initial high-incidence maneouvre phase immediately after missile launch is desirable. Supplementary 3-axis control during the subsequent thrust vector controlled mid/terminal phase of flight is more desirable if this can be used to simplify thrust vector control requirements.

As far as possible, the auxiliary control must not prejudice the aerodynamic thrust vector control trim situation during the initial course correction flight phase.

The auxiliary control system should also be capable of being contained within the confines of the launch tube, without imposing penalties on missile casing design.

The additional size and weight of the auxiliary control installation must be kept as small as possible.

According to the present invention, there is provided an auxiliary aerodynamic or hydrodynamic control surface assembly for a vehicle travelling through a fluid medium, comprising a plurality of retractable arcuate control surfaces each pivotally mounted to be swung about a single pivot in opposite directions from the retracted position so as to protrude at one end or the other from a housing of generally circular cross-section into which they retract.

Each control surface may be carried on the inner end of an arm that is mounted on a pivot at or adjacent the circular periphery of the housing, the arm extending from the pivot in a generally inward radial direction of the housing when the control surface is retracted, and the arm pivots being spaced equidistantly around the casing periphery and having pivot axes parallel to the longitudinal axis of the casing. Preferably, each control surface is of part-circular arcuate form centered on the respective arm pivot axis. It may extend equally on opposite sides of the respective arm and its arc length is such that, when retracted, its opposite ends both lie just within the confines of the housing, so that any movement of the arm in one direction or the other will cause one end or the other of the control surface to emerge from the housing. Preferably, there are three such control surfaces.

Such a control surface assembly can advantageously be incorporated in a guided missile in canard configuration.

Figure 1B:
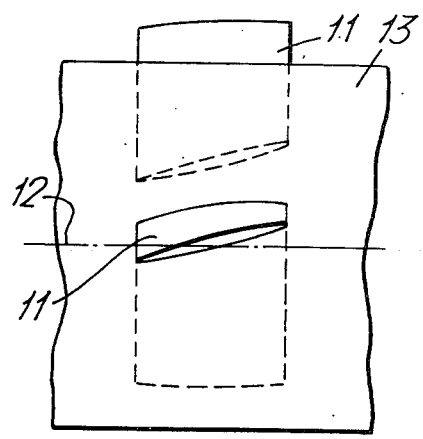
Figure 2A:
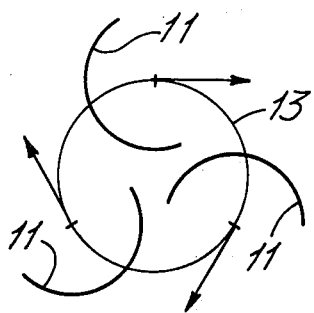
Figure 2B:
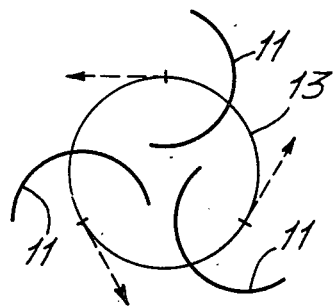
Figure 3:
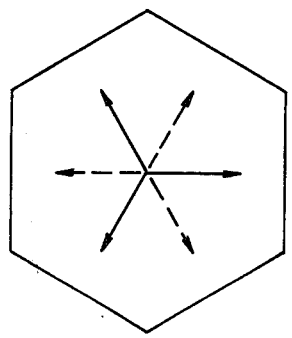
Figure 4:
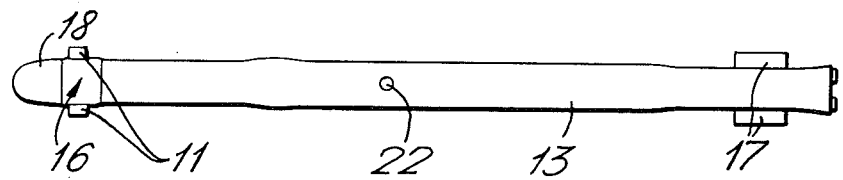
Figure 5A:
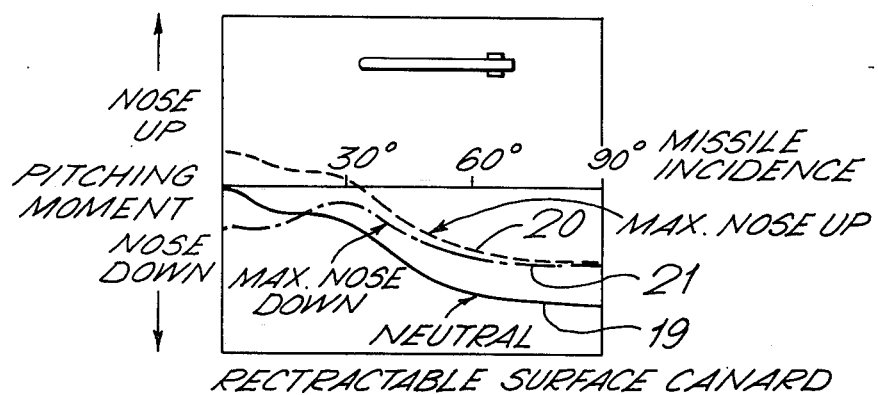
Figure 5B:
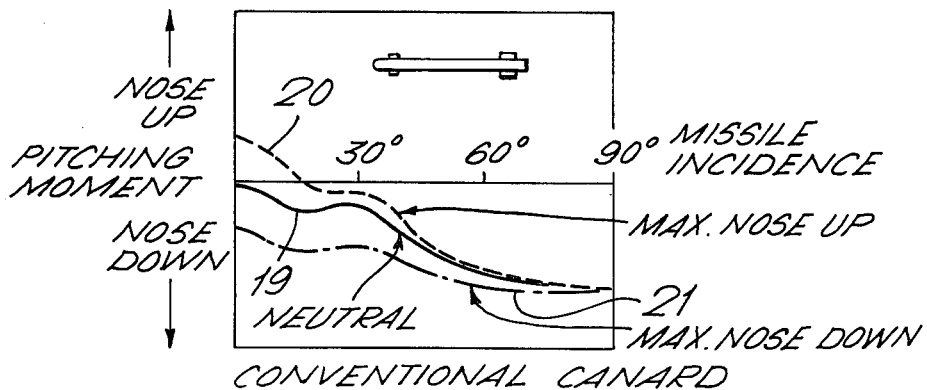
Figure 6:
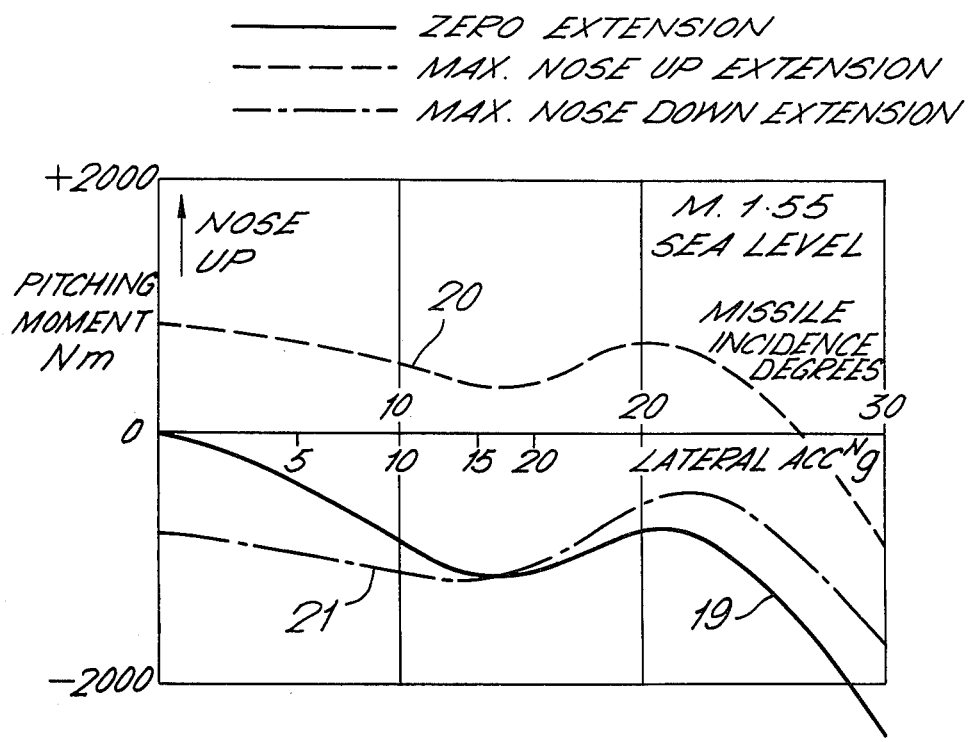
Figure 7B:
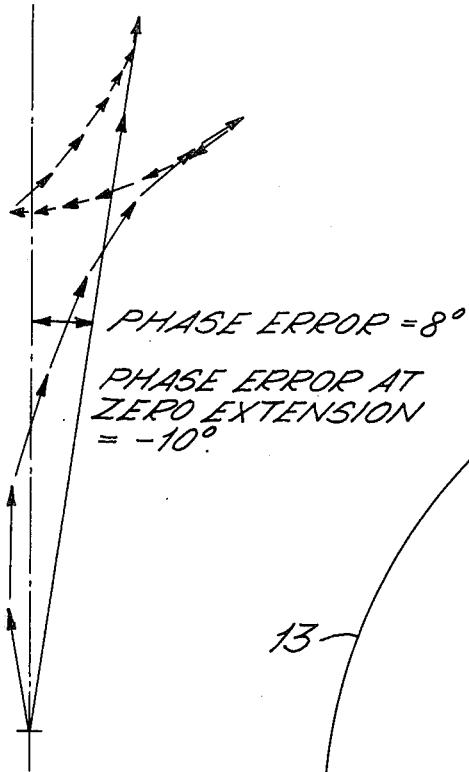
Figure 7A:
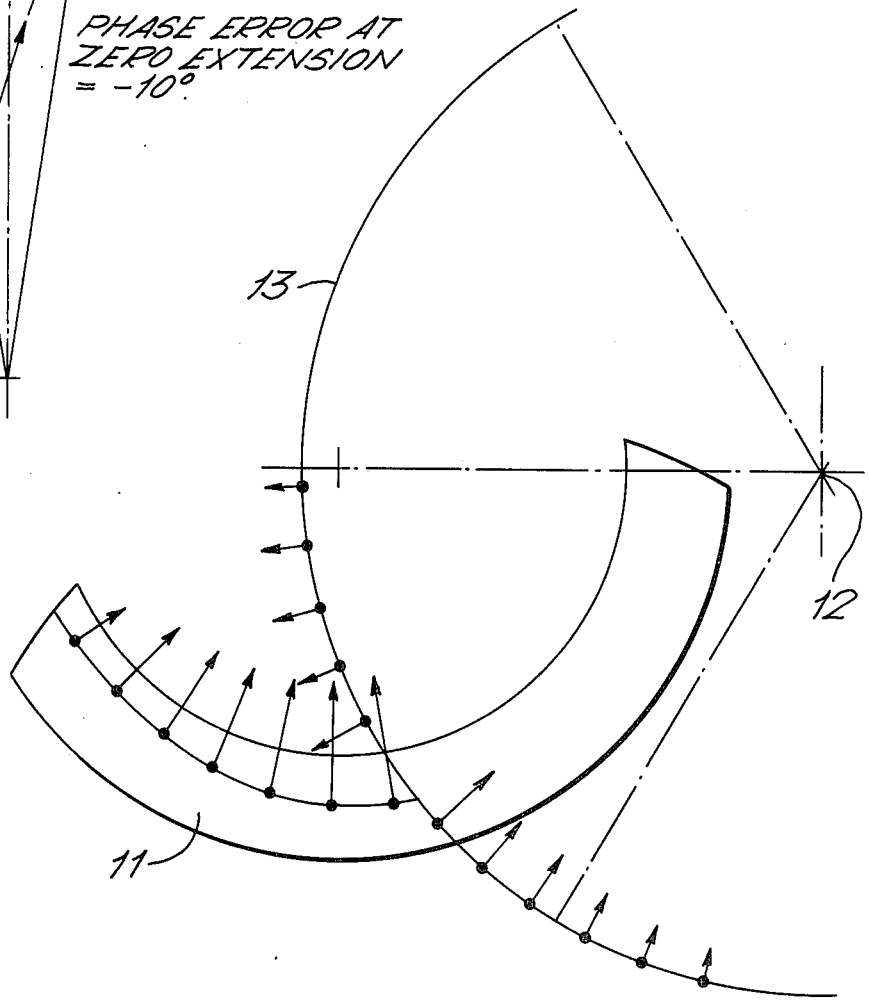
Figure 8:
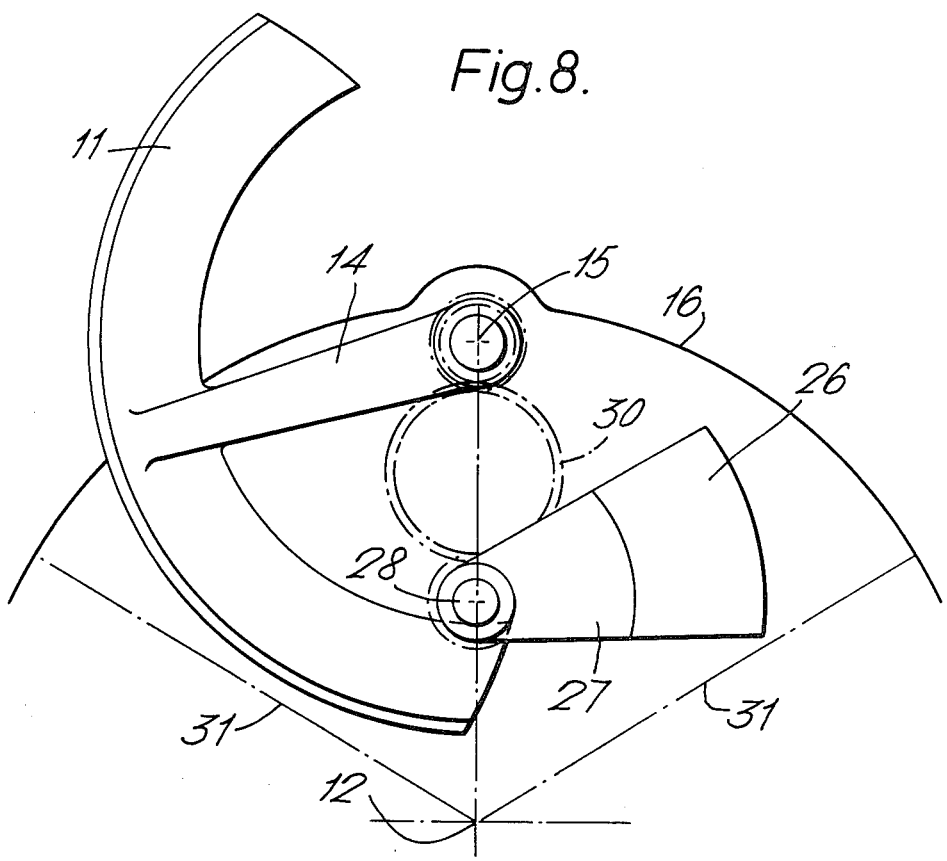
Figure 9:
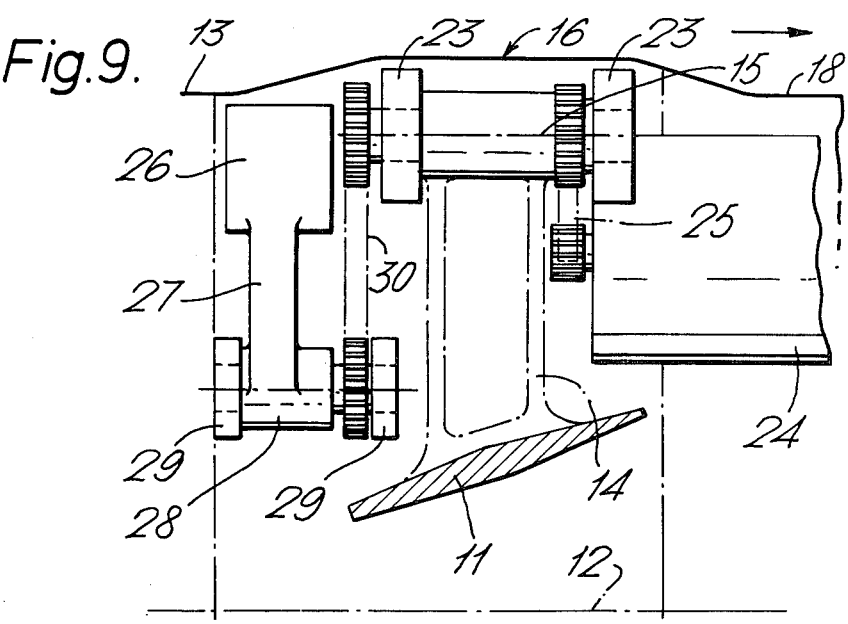

Arrangements according to the invention will now be described, by way of example, with reference to the accompanying drawings in which:

FIGS. 1a and 1b are, respectively, a diagrammatic end and side elevation of an auxiliary aerodynamic control unit, FIGS. 2a and 2b are diagrams illustrating roll control with such a unit, FIG. 3 is a vector diagram for zero roll, FIG. 4 shows, in side elevation, a missile fitted with such an auxiliary aerodynamic control unit in canard configuration, FIGS. 5a and 5b are pitching moment curves for the control surface arrangement of FIGS. 1a to 4 and for a conventional canard control surface arrangement, FIG. 6 shows pitching moment curves for the critical design case with the arrangement of FIGS. 1a to 4, FIGS. 7a and 7b are, respectively, a pressure distribution diagram in respect of a control surface and the associated vector summation diagram, and FIGS. 8 and 9 are, respectively, diagrammatic rear and side elevations of an arrangement in which the control surface is provided with a geared counterbalance weight.

The auxiliary aerodynamic control means shown schematically in FIGS. 1a and 1b consist of three retractable arcuate surfaces 11 set at a fixed angle of incidence relatively to the centre line 12 of the missile 13. Each surface 11 is carried at the inner end of a respective arm 14 that extends in toward the missile axis 12 from a pivotal mounting 15 on the missile body at or adjacent the missile body periphery. The pivots 15 are equidistantly spaced around the missile body periphery.

By swinging of an arm 14 in either direction about its pivot 15, away from a neutral radial direction of the arm, the surface 11 that it carries is driven into the air stream to provide lift in alternative opposing directions. The control surface arcs are each centred on the respective pivot point of the carrying arm and, while when the arms are in neutral position the arcuate surfaces are completely within the envelope of the missile body, movement of an arm from its neutral position immediately causes one end or the other of the arcuate surface to project beyond the missile body.

The system therefore provides three alternative pairs of force vectors which can be combined to give independent pitch, yaw and roll moments relative to three missile axes. FIGS. 2a and 2b show how, by swinging the arms 14 all in one direction, or all in the other direction, clockwise or anti-clockwise roll is achieved. FIG. 3 shows the vector diagram for zero roll. By moving a pair of control surfaces in opposite directions, a yaw or pitch moment can be achieved without inducing roll.

FIG. 4 is a schematic diagram showing an auxiliary aerodynamic control unit 16 added in a canard configuration to a missile 13 having thrust vector control and aerodynamic surfaces 17 at its aft end. The normal nose cone 18 of the missile is moved forward in order to accomodate the unit 16 between the nose and the main body of the missile. When fully retracted the control surfaces 11 of the unit 16 leave the aerodynamics unchanged, so that — apart from body length and centre of gravity changes — the thrust vector control mode of operation is unaffected.

The tri-form configuration of FIGS. 1a to 4 is preferred to a quadri-form configuration for two reasons:
  (i) The maximum span of the control surfaces would be very restricted in a quadri-form layout.

(ii) The aerodynamics will probably be highly non-linear and therefore the "limit-cycle" switched control technique is appropriate. A tri-form layout avoids the redundancy of switch functions inherent in a quadri-form layout (e.g. as in the Martel missile — which resorts to roll control on only two fins with position balancing on the other two).

FIGS. 5a and 5b are curves of pitching moment plotted against missile incidence angle, comparing the operation of the retractable control surface canard with a conventional canard arrangement. Curves 19, 20 and 21 represent, in each case, the neutral position of all the control surfaces, the control surfaces adjusted to give maximum nose-up pitching moment and the control surfaces adjusted to give maximum nose-down pitching moment. In the case of the retractable surface canard (FIG. 5a), at zero incidence angle equal nose-up and nose-down pitching moments are available. As incidence angle increases, the lift on a "nose-up" control surface increases until the surface stalls, whilst that on a "nose-down" surface reduces. At 90° incidence both configurations would be fully stalled to produce equal "nose-up" contributions. By contrast, a conventional canard (FIG. 5b) at low incidence angles has a more or less constant static margin (difference between maximum nose-up and nose-down pitching moments), so that for a basic design with similar design static margin (at zero control deflection), the missile tends to run out of nose-up trim power (curve 20) at a lower angle of incidence than with the retractable surface form of control.

FIG. 6 shows the trim situation of the control surface arrangement described at the critical design case; viz., at burn-out of the rocket motor or motors with the centre of gravity 22 (FIG. 4) furthest forward, and just over Mach 1.5 sea level flight speed. The estimated effect of control surface extension is shown for the configuration of FIG. 2. At higher altitudes, the magnitude of the pitching moments (and therefore of control power) is reduced in the ratio of the ambient atmospheric pressure, but the relative trim picture is unchanged.

FIG. 7a shows the estimated pressure distribution round the retractable surfaces 11 and adjacent missile body 13 at zero incidence. The resultant force vector summation is also shown in FIG. 7b. Some variation in the line of action of the resultant force occurs between zero and full extension, though the departure from the ideal - in terms of phasing error — should be no more than 10° or 15°. As incidence angle is increased the aerodynamics are likely to become more non-linear.

Hinge moments due to aerodynamic loads will be relatively small for the type of control surface shown in FIGS. 1a and 1b, because each surface lies along a circular arc about the pivot point 15 as centre. However, small load contributions will arise due to imperfections, distortion under load, and from aerodynamic loading on the control surface tips (or alternatively due to load components acting on tapered surfaces). Contributions from these sources probably add up to about 3 or 4 Nm max., as follows:

Moment from Load on tip (assuming untapered blade) = (pressure) × (cross-section area) × (moment arm) $1.5 \times 10^5 \text{ N/m}^2 \times 2 \text{ cm}^2 \times 5 \text{cm} = 1.5$ Nm max.

Moment from misalignments and distortion = (control surface load) × displacement of line of action) 500 N × 5 mm = 2.5 Nm max.

A simple counter balance weight is not possible if protrusion from the missile body is to be avoided. Therefore, a geared mass balance will be necessary. FIGS. 8 and 9 show diagrammatically such a geared mass balance, in addition to a servo-motor gear train for the primary drive. The control surface 11 carried on its arm 14 swings on the pivot 15 in the form of a shaft journalled in bearings 23. This shaft is driven by a servo-motor 24, housed largely in the missile nose 18, through a gear train 25. Immediately aft of the control surface 11, a balance weight 26 is carried by an arm 27 mounted for pivotal movement on a shaft 28 journalled in bearings 29. The shaft 28 is driven by the shaft 15 through a gear train 30. The position of maximum control surface extension is shown in FIG. 8, and it will be observed that the control arm 14 and the balance weight 26 remain within the casing of the unit. Indeed, the assembly when retracted lies within the sectoral portion of the unit internal volume bounded by the planes 31, and, on extension, nothing extends beyond the planes 31, the only protrusion being that of the control surface 11 outside the casing.

The arrangement of FIGS. 8 and 9 is aimed at providing the largest possible radius of control surface and a fairly high angle of incidence setting. The angle of incidence shown in FIG. 9 may not be optimum for any particular case, bearing in mind that the critical design point is at about 15° of missile incidence and a lower incidence setting of the blades might avoid blade stalling before this incidence angle is reached.

The auxiliary control surface hinge moments appear to be roughly half those of the control surfaces at the aft end of the missile. However, the maximum angular deflection of the auxiliary control surfaces is roughly twice that of the aft control blades. Therefore, servo-motors of the same size as those employed for the aft controls are indicated, each driving through a gear train with a smaller gear ratio. If additional thermal batteries are required to provide power to the auxiliary control surface servo-motors during the coasting flight phase, these may be accommodated in the same unit 16. However, in some cases there may be sufficient reserve capacity in the system supplying the aft end control blade motors to make extra batteries unnecessary.

From the aforesaid description it will be seen that the invention provides the following advantages.

Use of rotating circular arc control blades, each of which, by extension in one direction or the other in a single motion, is able to produce forces in either direction relative to the control axis.

By the variable geometry involved in the mode of operation, control effectiveness is maintained at large angles of incidence of the missile.

The system provides, with only a single pivot, both two-directional control and retraction.

By virtue of the circular arc movement the required actuator power is minimised.

What I claim is:

1. An auxiliary aerodynamic or hydrodynamic control surface assembly for a vehicle travelling through a fluid medium, comprising a plurality of retractable arcuate control surfaces each pivotally mounted to be swung in opposite directions from the retracted position so as to protrude at one end or the other from a housing of generally circular cross-section into which they retract; and wherein each control surface is carried on the inner end of an arm that is mounted on a single pivot at or adjacent the circular periphery of the housing, the arm extending from the pivot in a generally inward radial direction of the housing when the control surface is retracted, and the arm pivots being spaced equidistantly around the casing periphery and having pivot axes parallel to the longitudinal axis of the casing.

2. An assembly according to claim 1, wherein each control surface is of part-circular arcuate form centred on the respective arm pivot axis.

3. An assembly according to claim 2, wherein each control surface extends equally on opposite sides of the respective arm and its arc length is such that, when retracted, its opposite ends both lie just within the confines of the housing, so that any movement of the arm in one direction or the other will cause one end or the other of the control surface to emerge from the housing.

4. An assembly according to claim 1, wherein there are three control surfaces.

5. An assembly according to claim 1, wherein the full angular movement of each control surface is about 75° in each direction from the retracted position.

6. An assembly according to claim 1, wherein each control surface is provided with a counterbalance weight that swings about a pivot within the housing as the control surface swings and remains wholly enclosed within the housing.

7. An assembly according to claim 6, wherein the pivot of each control surface is a shaft, the counterbalance weight is mounted on a pivot shaft, and the two shafts are connected by a gear train and driven by a common servo-motor.

8. A guided missile having an auxiliary control surface assembly according to claim 1 incorporated in canard configuration.

9. A missile according to claim 8, wherein the auxiliary control surface assembly is inserted between the main body of the missile and the missile nose, and the missile also has further control surfaces and thrust vectoring control at its tail end for use during powered flight.

* * * * *